United States Patent [19]
Shine

[11] 3,943,654
[45] Mar. 16, 1976

[54] FISHINGLINE SINKER

[76] Inventor: Jerry Paul Shine, 1460 Hornblend St., San Diego, Calif. 92109

[22] Filed: May 16, 1975

[21] Appl. No.: 578,307

[52] U.S. Cl. ............................................. 43/43.14
[51] Int. Cl.² .................................... A01K 95/00
[58] Field of Search ............. 43/43.14, 43.12, 43.1

[56] References Cited
UNITED STATES PATENTS

| | | | |
|---|---|---|---|
| 2,584,356 | 2/1952 | Larson | 43/43.14 |
| 3,335,516 | 8/1967 | Sutton et al. | 43/43.12 |

*Primary Examiner*—Warner H. Camp
*Attorney, Agent, or Firm*—Henri J. A. Charmasson

[57] ABSTRACT

A fishingline sinker of adjustable weight, using discarded automobile engine sparkplugs as weighting elements releasably held by a circular strip of material.

1 Claim, 3 Drawing Figures

FISHINGLINE SINKER

BACKGROUND OF THE INVENTION

Anglers engaged in still fishing, deepsea fishing, or surfcasting have long used lead sinkers of various weights to force their bait underwater, or to propel their lures. Proper weighting of a line is often achieved by the trial and error method, requiring several substitutions of sinkers of different weights. The present invention provides for rapid addition and/or subtraction of various weighting elements by connecting or disconnecting used sparkplugs to the fishingline. Furthermore, considering the frequency of lead sinker loss due to the breakage or entanglement of the fishingline, the present invention presents a less costly and less onerous solution. The lead sinker is replaced by old, discarded automobile sparkplugs having little or no salvage value. Such sparkplugs are common in the household of today's amateur mechanic, or may be acquired at minimal cost from garages or repair shops.

SUMMARY

The subject invention provides a new fishingline sinker composed of a holding member, which can be attached to a fishingline, having a plurality of apertures shaped to receive and hold combustion-engine sparkplugs used as weighting elements.

IN THE DRAWINGS

DESCRIPTION OF THE PREFERRED EMBODIMENT

Figure 1:
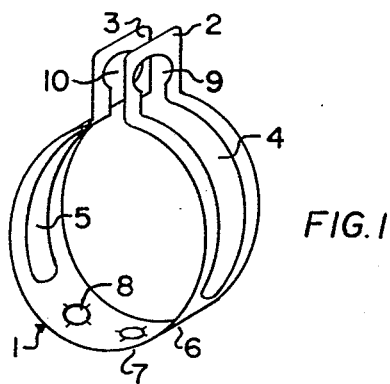
FIG. 1 is a lifesize perspective view of a holding member.
Figure 2:
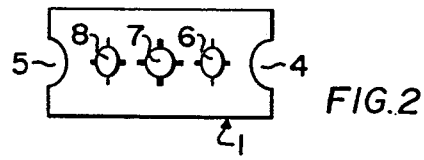
FIG. 2 is a lifesize bottom view of the holding member shown in FIG. 1.
Figure 3:
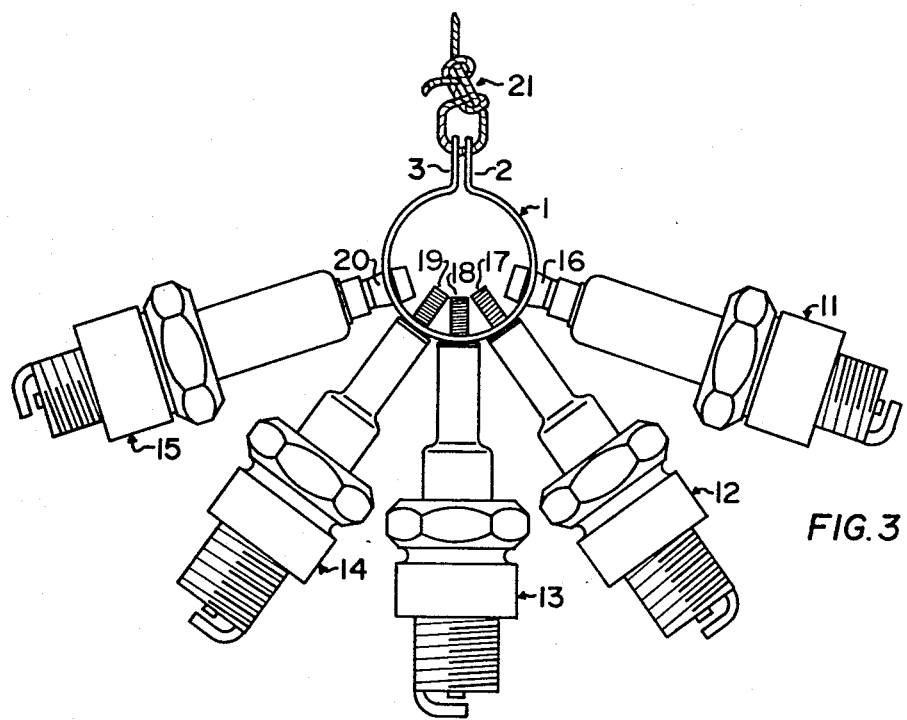
FIG. 3 is a lifesize front view of a sinker embodying the present invention.

Referring now to the drawings in detail, the preferred embodiment of the present invention is illustrated in FIGS. 1 through 3. FIG. 3 is a front view of the embodiment showing five combustion-engine sparkplugs 11, 12, 13, 14, and 15 connected to a line 21 (such as a fishing line), by means of a ring-shaped holding element 1. It should be noted that the holding element 1 can accomodate two types of sparkplugs. The first type, illustrated in sparkplugs 11 and 15, includes an upper terminal of the snap-on type, such as can be found in most American-built automobiles. The second type, illustrated in sparkplugs 12, 13 and 14, features a threaded terminal, such as can be found in certain European-built automobiles. The detailed construction of the holding element 1 is better described in the perspective view illustrated in FIG. 1. It can be seen that the holding element 1 is formed from a strip of flat material, preferably 11 centimeters long, 12 millimeters wide, and 0.5 millimeters thick, bent into circular shape, with the ends 2 and 3 bent at right angles, projecting towards the outside of the circle delineated by the bent flexible strip of material. Two round apertures 9 and 10, preferably 6.5 millimeters in diameter, have been drilled through ends 2 and 3 respectively, so that when the ring is closed, these two apertures match, forming an eyelet through which the fishingline can be connected. Two slots 4 and 5, preferably 5.5 millimeters wide and 3 centimeters long, run through the center of the strip from apertures 9 and 10 respectively.

Between the lower ends of slots 4 and 5, three round apertures, 6, 7, and 8, of 3 milimeters diameter have been drilled. FIG. 2, which represents a bottom view of the holding element 1 shown in FIG. 1, illustrates the shape and location of these apertures. Around the edges of each of these three apertures, a plurality of notches has been cut to a depth of 1.5 millimeters, so that the aperture expands when the threaded-type terminal of a sparkplug is forced into it, exercising a positive locking action against said terminal. The sinker is assembled according to the following procedure:

As shown in FIG. 3, the fishingline 21 is connected to the holding member 1 by means of a loop large enough to allow a gap of approximately 5 millimeters between the ends 2 and 3 of the holdmember 1 when the fishingline is not under tension.

Sparkplugs with a snap-on type terminal may be connected to the holding member by inserting the terminal head through the aperture 9 or 10 shown in FIG. 1, then lowered into slot 4 or 5.

Sparkplugs with a threaded-type terminal can be connected to the holding member by inserting said terminal into the apertures 6, 7, or 8 shown in FIG. 2.

When tension is applied to the line under the weight of the sparkplug, the gap between the ends 2 and 3 of the holding element 1 is closed, preventing the former type of sparkplugs from sliding out of the retaining slots 4 and 5. The configuration of the apertures 6, 7, and 8 described above provides a positive locking action, so that the threaded-type terminal sparkplugs can only be separated from the holding element 1 by an unscrewing motion applied to the sparkplugs. From the preceding, it can be easily understood that sparkplugs of either type can be readily added or subtracted to increase or decrease the weight of the sinker, without having to disconnect the fishingline from the sinker assembly. The described preferred embodiment could be modified to accept a greater or lesser number of sparkplugs of either type, or to accept only one type of sparkplug. The length, shape, and number of apertures of the holding element could be varied without departing from the basic concept of the present invention. While the instant invention has been disclosed as an improvement in the use of fishingline sinkers, it is to be appreciated that it will be useful in many types of application where variable weighting elements are needed.

While I have shown and described the preferred form of the present invention and have suggested modifications therein, other changes and modifications may be made therein, within the scope of the appended claims, without departing from the spirit and scope of this invention.

What is claimed is:

1. A weighting device which comprises at least one sparkplug and means for connecting at least one sparkplug to a fishingline, said means comprising a flat strip of flexible material bent into a circular shape, with both ends at right angles and projecting toward the outside of a circle delineated by the flexible strip, said ends having matching apertures through which the fishingline can be connected, and a plurality of apertures along said strip shaped to receive and hold a variety of sparkplugs by their terminals.

* * * * *